United States Patent
Choi (10) Patent No.: US 9,319,580 B2
(45) Date of Patent: Apr. 19, 2016

(54) METHOD AND APPARATUS FOR SHOOTING AND STORING MULTI-FOCUSED IMAGE IN ELECTRONIC DEVICE

(71) Applicant: Samsung Electronics Co., Ltd, Gyeonggi-do (KR)

(72) Inventor: Young-Keun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 14/078,250

(22) Filed: Nov. 12, 2013

(65) Prior Publication Data

US 2014/0139721 A1    May 22, 2014

(30) Foreign Application Priority Data

Nov. 12, 2012    (KR) .......................... 10-2012-0127444

(51) Int. Cl.
*H04N 5/232*    (2006.01)
*H04N 5/235*    (2006.01)

(52) U.S. Cl.
CPC ......... *H04N 5/23212* (2013.01); *H04N 5/2356* (2013.01); *H04N 5/23216* (2013.01); *H04N 5/23293* (2013.01)

(58) Field of Classification Search
CPC .................................................. H04N 5/23212
USPC .......................................................... 348/345
See application file for complete search history.

(56) References Cited

U.S. PATENT DOCUMENTS

| | | | |
|---|---|---|---|
| 8,111,321 B2 * | 2/2012 | Yoshida | 348/345 |
| 8,797,448 B2 * | 8/2014 | Capata et al. | 348/345 |
| 2009/0059061 A1 * | 3/2009 | Yu et al. | 348/347 |
| 2009/0268080 A1 * | 10/2009 | Song et al. | 348/349 |
| 2010/0128163 A1 * | 5/2010 | Nagasaka et al. | 348/348 |
| 2012/0120269 A1 * | 5/2012 | Capata et al. | 348/222.1 |
| 2015/0029382 A1 * | 1/2015 | Chun et al. | 348/333.03 |

FOREIGN PATENT DOCUMENTS

| | | |
|---|---|---|
| KR | 10-2004-0103786 | 12/2004 |
| KR | 10-0801088 | 2/2008 |
| KR | 10-2009-0101486 | 9/2009 |
| KR | 10-2011-0012849 | 2/2011 |

* cited by examiner

*Primary Examiner* — James Hannett (57) ABSTRACT

A method for shooting a multi-focused image in an electronic device includes selecting a plurality of focus targets in a preview mode, calculating camera lens moving distances of the focus targets, and shooting an image of each focus target from a single fixed angle by reference to the camera lens moving distances of the focus targets. Thus, a user does not have to move the focus several times from the fixed angle.

25 Claims, 8 Drawing Sheets

METHOD AND APPARATUS FOR SHOOTING AND STORING MULTI-FOCUSED IMAGE IN ELECTRONIC DEVICE

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Nov. 12, 2012, and assigned Serial No. 10-2012-0127444, the entire disclosure of which is hereby incorporated by reference.

TECHNICAL FIELD

The present disclosure relates generally to an electronic device. More particularly, the present disclosure relates to a method and an apparatus for manually or automatically selecting multiple focuses of a camera and shooting multi-focused images from a single angle in a portable terminal including the camera.

BACKGROUND

Thanks to advances of information communication technology and multimedia technology, most electronic devices such as portable terminals support a digital camera function. Recent portable terminals are equipped with a camera of the resolution substantially similar to stand-alone digital cameras. The portable terminal is under development to realize functions of the digital camera and to enhance image quality. To enhance image quality, the portable terminal evolves from the single-focus module to provide an Auto Focusing (AF) function which automatically changes the focus based on a distance to a subject and a mechanical shutter. Further, an optical zoom function is employed.

AF systems are largely divided into active systems and passive systems based on the distance measurement between the camera and the subject. The active systems measure the distance between the camera and the subject by emitting ultrasonic sound waves or infrared light and using a signal reflected by the subject. The passive systems obtain a Focus Value (FV) useful for adjusting the focus by detecting a high frequency component of an image captured by an image sensor, and moves a lens to a point of the maximum FV.

However, the related art merely allows a user to select a single focus manually to capture a single image, or allows the camera sensor to arbitrarily select multiple focuses. To shoot the image with the intended multiple focuses from a single angle, the user needs to repeat the shooting from the single fixed angle.

As discussed above, to obtain the multi-focused image from the single angle, the user needs to move the focus several times from the fixed angle.

SUMMARY

To address the above-discussed deficiencies of the related art, the present disclosure provides a method and an apparatus for shooting and storing a multi-focused image in an electronic device.

The disclosure also provides a method and an apparatus for selecting multiple focuses using manual touch or automatically, and obtaining and displaying a plurality of images using a burst shot in a portable terminal.

The disclosure also provides a method and an apparatus for composing an image corresponding to a focus which is set by a link between burst shots based on multi-focus information in a portable terminal.

According to the present disclosure, a method for shooting a multi-focused image in an electronic device includes selecting a plurality of focus targets in a preview mode; calculating camera lens moving distances of the focus targets; and shooting an image of each focus target from a single fixed angle by reference to the camera lens moving distances of the focus targets.

According to the present disclosure, an electronic device includes a camera; one or more processors; a memory; and one or more programs stored in the memory and configured for execution by the one or more processors. The program includes instructions for selecting a plurality of focus targets in a preview mode, calculating camera lens moving distances of the focus targets; and shooting an image of each focus target with a single fixed angle by reference to the camera lens moving distances of the focus targets.

According to the present disclosure, an apparatus of a camera for shooting a multi-focused image includes a camera lens; and a processor for selecting a plurality of focus targets in a preview mode, calculating camera lens moving distances of the focus targets, and shooting an image of each focus target with a single fixed angle by reference to the camera lens moving distances of the focus targets.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a method and apparatus for shooting and storing a multi-focused image in an electronic device.

Figure 1:
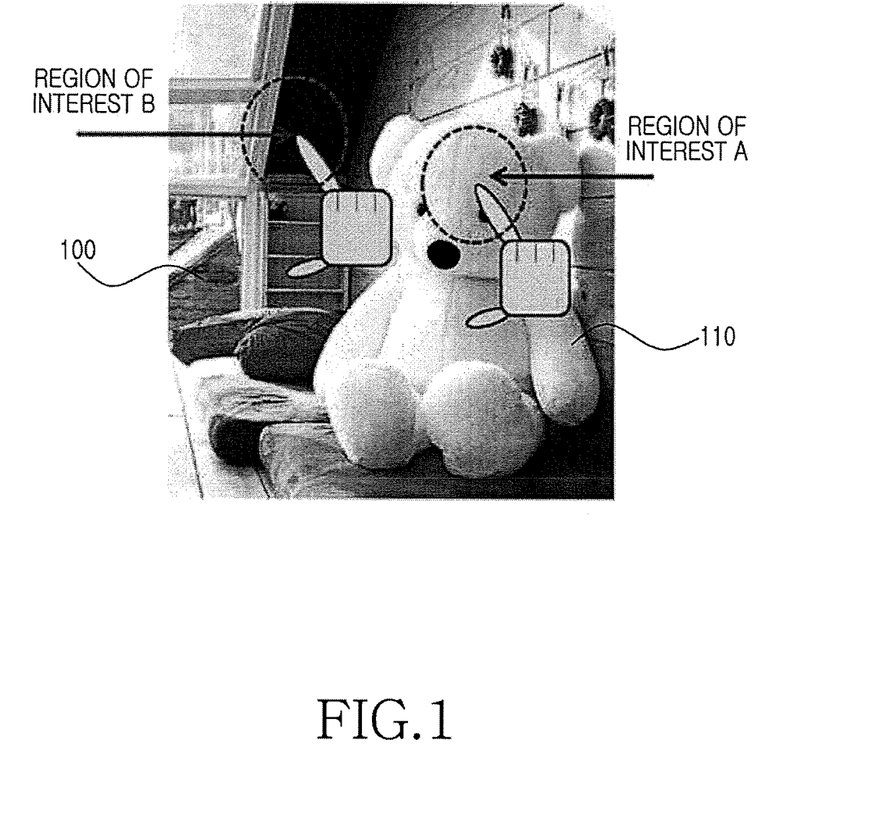
FIG. 1 illustrates multiple focuses in a preview mode according to certain embodiments of the present disclosure.

FIG. 1 depicts multiple focuses in a preview mode according to certain embodiments of the present disclosure.

Referring to FIG. 1, a user can execute a camera preview function and then touch focus targets (or subjects) or select the focus targets based on button input.

For example, when two regions of interest A and B, that is, the focus targets include a teddy bear 110 and a background 100, the user touches the teddy bear 110 and the background 100. Herein, while the two focus targets are selected, the user can select and touch more focus targets.

Figure 2:
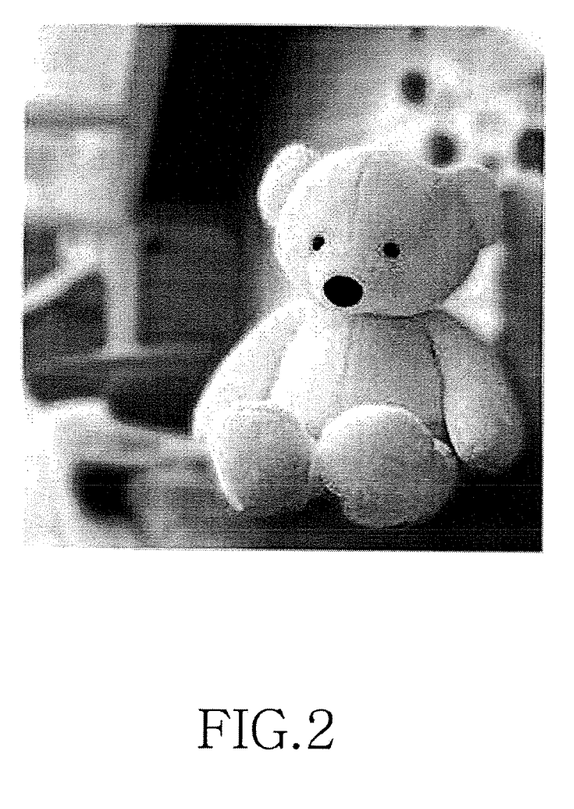
FIG. 2 illustrates an image based on a first focus of the multiple focuses according to certain embodiments of the present disclosure.

FIG. 2 depicts an image based on a first focus of the multiple focuses according to certain embodiments of the present disclosure.

Referring to FIG. 2, the image is displayed when the teddy bear of FIG. 1 is focused. In so doing, the teddy bear, being the focus target, is displayed sharply, and the background behind the teddy bear is blurry.

Figure 3:
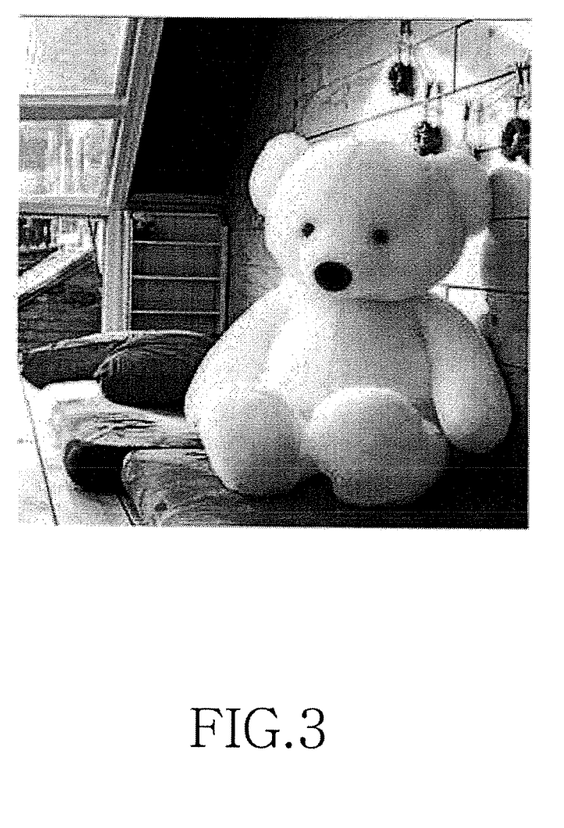
FIG. 3 illustrates an image based on a second focus of the multiple focuses according to certain embodiments of the present disclosure.

FIG. 3 depicts an image based on a second focus of the multiple focuses according to certain embodiments of the present disclosure.

Referring to FIG. 3, the image is displayed when the background of FIG. 1 is focused. In so doing, the background being the focus target is displayed sharply, and the teddy bear is blurry.

Figure 4A:
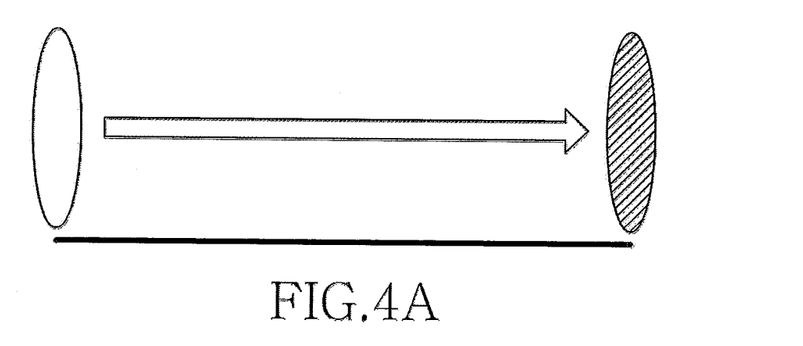
FIGS. 4A to 4C illustrate camera lens movements to change a multi-focus position according to certain embodiments of the present disclosure.
Figure 4B:
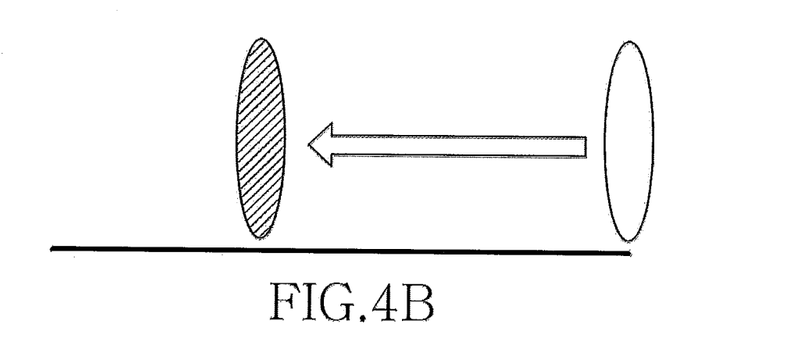
Figure 4C:
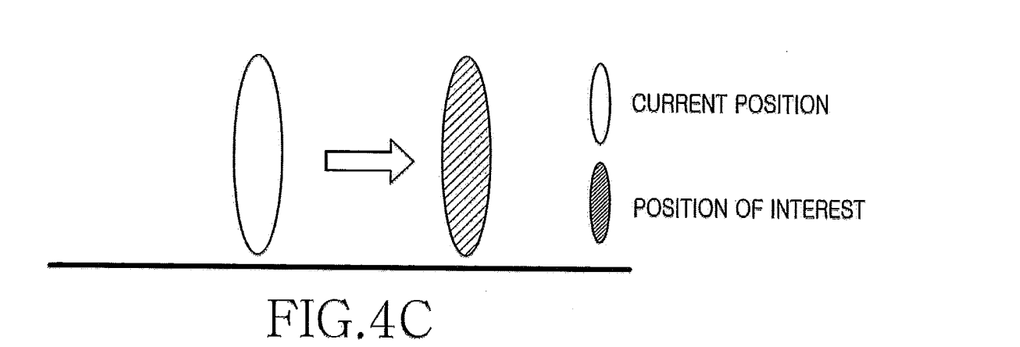

FIGS. 4A to 4C depict camera lens movement to change a multi-focus position according to certain embodiments of the present disclosure.

Referring to FIGS. 4A to 4C, the camera lens position needs to move according to the focus target based on an input order of the focus target. For example, when three focus targets are selected from the single angle, the camera lens position needs to change according to the three focus targets. The first focus target is captured by moving the camera lens as shown in FIG. 4A, the second focus target is captured by moving the camera lens as shown in FIG. 4B, and the third focus target is captured by moving the camera lens as shown in FIG. 4C. Herein, the camera lens moving distance of the first focus target is the longest, the camera lens moving distance of the second focus target is medium, and the camera lens moving distance of the third focus target is the shortest.

When the three focus targets are captured based on the input order of the focus target without an optimized camera moving algorithm, the moving distance of the camera lens can result in time difference. The time difference becomes a delay between the burst shots to thus degrade the image quality. To prevent this shortcoming and to accelerate the shooting, the distance to the input subject is measured based on an input image signal through the preview. After measuring and arranging the distances of the input subject, the subject is captured in order from the long distance to the short distance, from the short distance to the long distance, or at the current position, so as to minimize the camera moving distance (see FIGS. 5A to 5C).

Figure 5A:
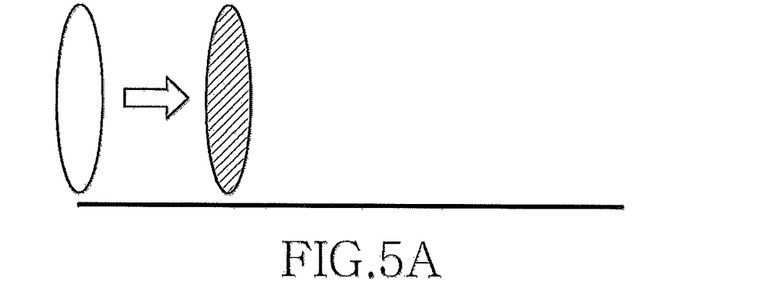
FIGS. 5A to 5C illustrate the camera lens movements to change the multi-focus position according to certain embodiments of the present disclosure.
Figure 5B:
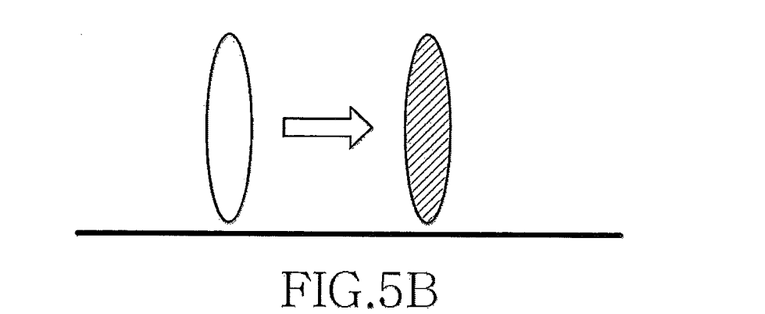
Figure 5C:
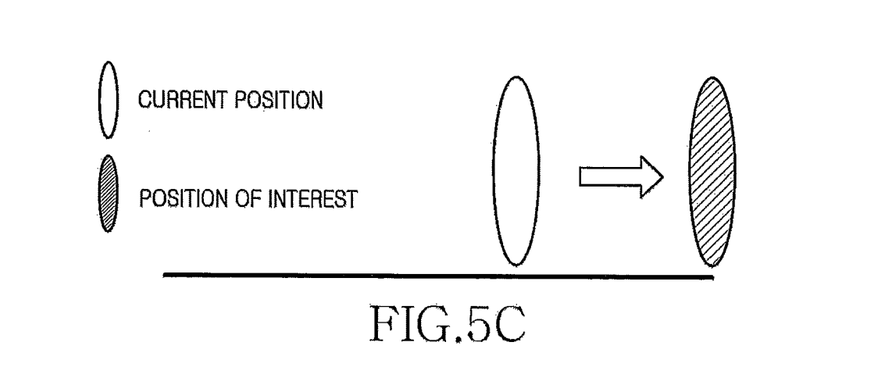

FIGS. 5A to 5C depict the camera lens movement to change the multi-focus position according to certain embodiments of the present disclosure.

Referring to FIGS. 5A to 5C, when three multi-focused targets are given, the three focus targets are captured in sequence to minimize the camera lens moving distance.

For example, when the focus targets are shot from the short distance, the closest first focus target is shot by moving the camera lens as shown in FIG. 5A, the second focus target is shot by moving the camera lens from the camera lens position of the first focus target as shown in FIG. 5B, and the third focus target is shot by moving the camera lens from the camera lens position of the second focus target as shown in FIG. 5C.

Herein, the three focus targets are shot in sequence to minimize the camera lens moving distance, to thus shorten the delay between the burst shots.

Figure 6:
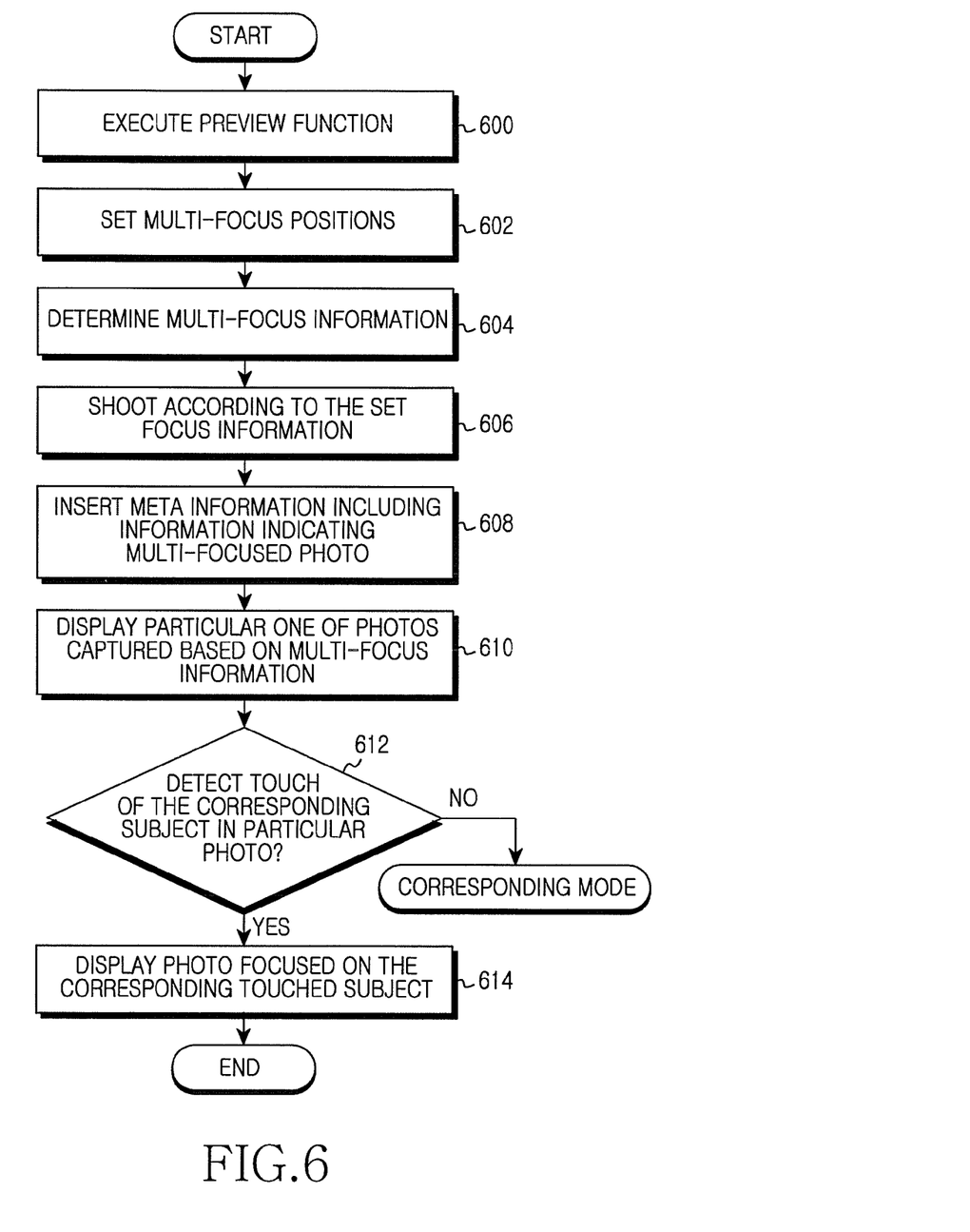
FIG. 6 illustrates a method for shooting and displaying a multi-focused image in an electronic device according to certain embodiments of the present disclosure.

FIG. 6 illustrates a method for shooting and displaying the multi-focused image in an electronic device according to certain embodiments of the present disclosure.

Referring to FIG. 6, the electronic device executes a photo preview function in block 600 and sets multiple focus positions in block 602. For example, a particular focus target is selected based on the user touch or the button input as shown in FIG. 1. When the user selects the subjects of interest in the photo preview mode by touching the subject or moving the button, regardless of their order, the electronic device stores the corresponding input order and the focus target position.

Alternatively, a plurality of focus targets can be automatically selected. For example, the electronic device can detect the subjects in the captured image of the preview mode and store position information of the corresponding focus target.

Alternatively, the focus target can be input using a voice command instead of the user touch and the button manipulation. For example, when the "background" and the "person" are input, an image focused on the background and an image focused on the person can be created.

In block 604, the electronic device determines multi-focus information. That is, the electronic device determines the camera lens position for each focus target. In so doing, the order of the camera lens movement can be determined based on the order of the focus target input or to minimize the camera lens moving distance regardless of the focus target input order.

In other words, the electronic device measures and arranges the distances of the input subject, determines the camera lens moving distance in sequence from the long distance to the short distance, from the short distance to the long distance, or at the current position, so as to minimize the moving distance, stores camera lens moving information of the focus targets, and sets the shooting order in the image shooting. In FIG. 5, the lens is moved according to a method for moving the camera position from the short distance to the long distance of the camera lens distance movement optimization algorithm. The optimization can vary according to various embodiments of the present disclosure.

When a burst shot event occurs, the electronic device shoots the focus targets by moving the camera lens in order based on the set focus information, that is, the camera lens position information of the focus targets (see FIG. 4 and FIG. 5) in block 606.

More specifically, the camera lens position is determined by a Focus Value (FV) which is the value of the sharpness of the image in the selected focus region. The FV calculation method can adopt, but not limited to, Sobel, Sum-Modified Laplacian (SML), Frequency Selective Weighted Median (FSWM) filter, Energy Of image Laplacian (EOL), Bayes-spectral-Entropy (BE) based on Discrete Cosine Transform (DCT), and Mid Frequency (MF)-DCT. The FV calculation method can adopt various algorithms.

In block 608, the electronic device inserts exchangeable image file format (exif) information of the captured photo and meta information indicating the multi-focused photo from the single angle, into an image file. The exif information is an image file format stored in the image file of the digital camera, and can record detailed additional information such as image data, camera maker, camera model, image editor software, photo modified date/time, Exif version, shoot date/time, original image size uploaded to web, exposure time (shutter speed), exposure program, focal length, F-number, and flash. Since the image data mostly uses a Tagged Image File Format (TIFF) or Joint Photographic Experts Group (JPEG) compression file, the image data of the TIFF or JPEG file can be modified, displayed, and edited using the software. The electronic device can link position information received from a Global Positioning System (GPS) receiver to the camera. The electronic device can efficiently manage image files and obtain the image information using the information recorded in the Exif.

In block 610, the electronic device displays a particular one of the captured images according to the multi-focus information. The particular image is captured by focusing on a particular subject.

When displaying the particular multi-focused photo and detecting the touch or the key input to the corresponding image subject in block 612, the electronic device displays the image captured from the same angle with the focus on the corresponding touched subject in block 614.

By contrast, when no photo focuses on the corresponding subject, the electronic device displays the current photo or the photo focused on the closest portion of the subject according to user's setup.

Next, the electronic device finishes this process.

Figure 7:
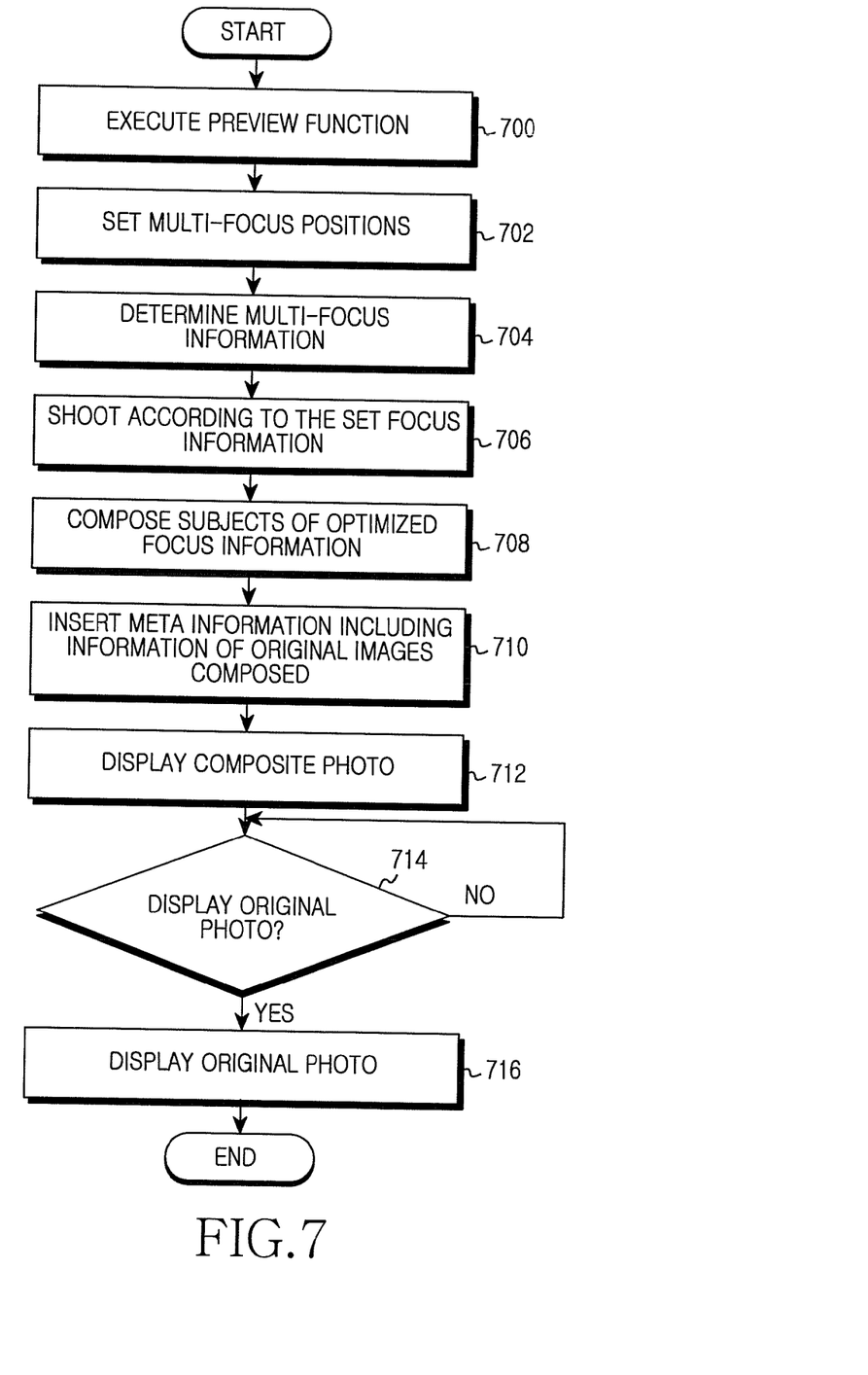
FIG. 7 illustrates a method for shooting and composing the multi-focused images in the electronic device according to certain embodiments of the present disclosure.

FIG. 7 illustrates a method for shooting and composing the multi-focused images in the electronic device according to certain embodiments of the present disclosure.

Referring to FIG. 7, the electronic device executes the photo preview function in block 700 and sets the multiple focus positions in block 702. For example, a particular focus target is selected based on the user touch or the button input as shown in FIG. 1. When the user selects the subjects of interest in the photo preview mode by touching the subject or moving the button regardless of their order, the electronic device stores the corresponding input order and the focus target position.

Alternatively, the plurality of the focus targets can be automatically selected. For example, the electronic device can detect the subjects in the captured image in the preview mode and store the position information of the corresponding focus target.

Alternatively, the focus target can be input using the voice command instead of the user touch and the button manipulation. For example, when the "background" and the "person" are input, the image focused on the background and the image focused on the person can be created.

In block 704, the electronic device determines the multi-focus information. That is, the electronic device determines the camera lens position for each focus target. In so doing, the order of the camera lens movement can be determined based on the order of the focus target input or to minimize the camera lens moving distance regardless of the focus target input order.

In other words, the electronic device measures and arranges the distances of the input subject, determines the camera lens moving distance in sequence from the long distance to the short distance, from the short distance to the long distance, or at the current position, so as to minimize the moving distance, stores camera lens moving information of the focus targets, and sets the shooting order in the image shooting. In FIG. 5, the lens is moved according to the method for moving the camera position from the short distance to the long distance of the camera lens distance movement optimization algorithm. The optimization can vary according to various embodiments of the present disclosure.

When the burst shot event occurs, the electronic device shoots the focus targets by moving the camera lens in sequence based on the set focus information, that is, the camera lens position information of the focus targets (see FIG. 4 and FIG. 5) in block 706.

More specifically, the camera lens position is determined by the FV which is the value of the sharpness of the image in the selected focus region. The FV calculation method can adopt, but not limited to, Sobel, SML, FSWM filter, EOL, BE based on the DCT, and MF-DCT. The FV calculation method can adopt various algorithms.

In block 708, the electronic device composes the subjects of the optimized focus information. For example, the electronic device composes the image focused on the teddy bear of FIG. 2 and the image focused on the background of FIG. 3. That is, a new image is created by composing the focused teddy bear and the focused background.

In block 710, the electronic device inserts the meta information including original image information to the composite image file. For example, the meta information about the image focused on the teddy bear and the image focused on the background is inserted to the image file generated by composing the focused teddy bear and the focused background.

In block 712, the electronic device displays the composite photo.

When an event displays the original photo from the composite photo in block 714, for example, when the event displays the original photo of the image focused on the teddy bear or the image focused on the background in the composite image of the focused teddy bear and the focused background, the electronic device displays the original photo focused on the corresponding subject (e.g., the image focused on the teddy bear or the image focused on the background) using the meta information of the original photo in block 716.

Next, the electronic device finishes this process.

Figure 8:
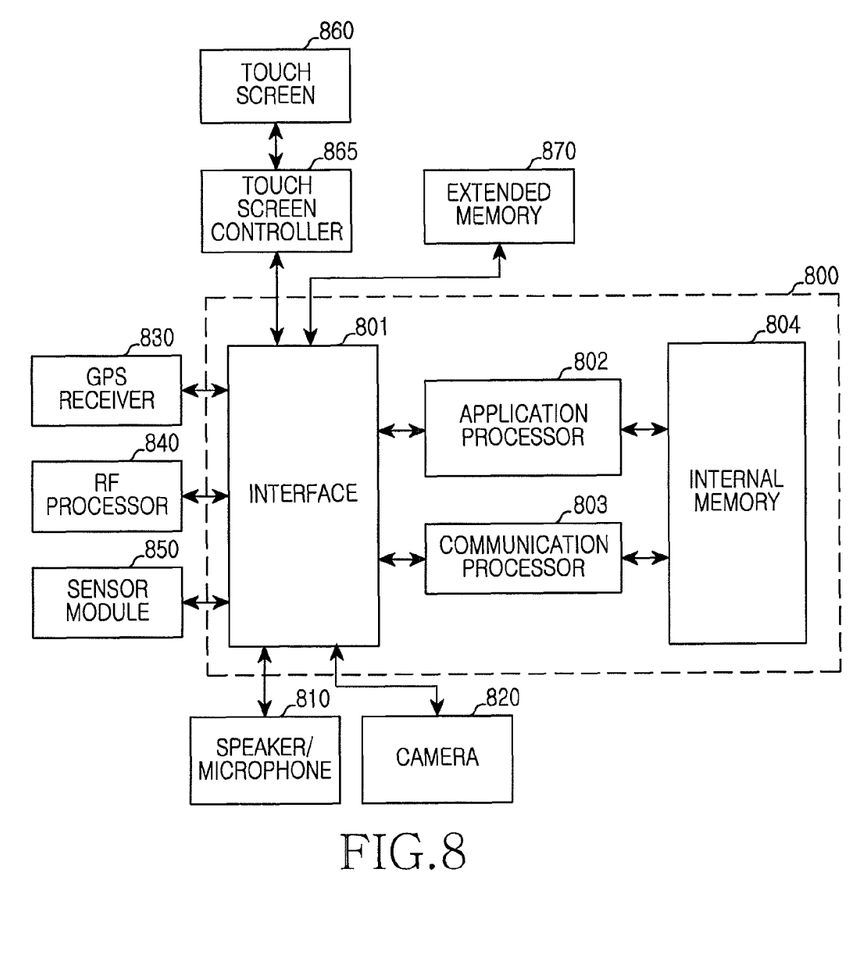
FIG. 8 illustrates the electronic device according to certain embodiments of the present disclosure.

FIG. 8 is a block diagram of the electronic device according to certain embodiments of the present disclosure.

The electronic device can employ portable electronic devices such as portable terminal, mobile phone, mobile pad, media player, tablet computer, handheld computer, or Personal Digital Assistant (PDA). The electronic device can be a portable electronic device combining two or more functions of those devices.

Referring to FIG. 8, the electronic device includes a controller 800, a speaker/microphone 810, a camera 820, a GPS receiver 830, a Radio Frequency (RF) processor 840, a sensor module 850, a touch screen 860, a touch screen controller 865, and an extended memory 870.

The controller 800 can include an interface 801, one or more processors 802 and 803, and an internal memory 804. In some cases, the whole controller 800 can be referred to as the processor. The interface 801, the application processor 802, the communication processor 803, and the internal memory 804 can be separate components or integrated onto one or more integrated circuits.

The application processor 802 performs various functions for the electronic device by running various software programs, and the communication processor 803 processes and controls voice communication and data communication. In addition to those typical functions, the processors 802 and 803 also execute a particular software module (instruction set) stored in the extended memory 870 or the internal memory 804 and conduct particular functions corresponding to the module. That is, the processors 802 and 803 carry out the present method (see FIG. 6 and FIG. 7) for shooting and displaying the multi-focused image in association with software modules stored in the extended memory 870 or the internal memory 804.

For example, the application processor 802 executes the photo preview function and sets the multi-focus position. For example, a particular focus target is selected based on the user touch or the button input as shown in FIG. 1. In so doing, when the user selects the subjects of the interest regardless of their order in the photo preview mode using the touch and the button movement, the application processor 802 stores the corresponding input order and the focus target positions in the electronic device. Alternatively, the multiple focus targets can be automatically selected. For example, the electronic device can detect the subjects in the captured image in the preview mode and store the position information of the corresponding focus target. Alternatively, the focus target can be input using the voice command instead of the user touch and the button manipulation. For example, when the "background" and the "person" are input, the image focused on the background and the image focused on the person can be created.

Further, the application processor 802 determines the multi-focus information. That is, the application processor 802 determines the camera lens position for each multi-focus target. In so doing, the order of the camera lens movement can be determined based on the order of the focus target input or to minimize the camera lens moving distance regardless of the focus target input order.

In other words, the electronic device measures and arranges the distances of the input subject, determines the camera lens moving distance in order from the long distance to the short distance, from the short distance to the long distance, or at the current position, so as to minimize the moving distance, stores camera lens moving information of the focus target, and sets the shooting order in the image shooting. In FIG. 5, the lens is moved according to the method for moving the camera position from the short distance to the long distance of the camera lens distance movement optimization algorithm. The optimization can vary according to various embodiments of the present disclosure.

When the burst shot event occurs, the application processor 802 shoots the focus targets by moving the camera lens in order based on the set focus information, that is, the camera lens position information of the focus targets (see FIG. 4 and FIG. 5). More specifically, the camera lens position is determined by the FV which is the value of the sharpness of the image in the selected focus region. The FV calculation method can adopt, but not limited to, Sobel, SML, FSWM filter, EOL, BE based on the DCT, and MF-DCT. The FV calculation method can adopt various algorithms.

The application processor 802 inserts the exif information of the captured photo and the meta information indicating the multi-focused photo from the single angle, into the image file, and displays a particular one of the captured images according to the multi-focus information. The particular image is captured by focusing on a particular subject.

When displaying the particular photo including the multi-focus photo information and detecting the touch or the key input to the subject of the corresponding image, the application processor 802 displays the photo captured from the same angle with the focus on the corresponding touched subject. By contrast, when no photo focuses on the corresponding subject, the application processor 802 displays the current photo or the photo focused on the closest region of the subject according to the user's setup.

The application processor 802 composes the subjects of the optimized focus information. For example, the application processor 802 composes the image focused on the teddy bear of FIG. 2 and the image focused on the background of FIG. 3. That is, the new image is created by composing the focused teddy bear and the focused background.

The application processor 802 inserts the meta information including the original image information to the composite image file and displays the composite photo. For example, the meta information about the image focused on the teddy bear and the image focused on the background is inserted to the image file generated by composing the focused teddy bear and the focused background.

When the event displays the original photo from the composite photo, for example, when the event displays the original photo of the image focused on the teddy bear or the image focused on the background in the composite image of the focused teddy bear and the focused background, the application processor 802 displays the original photo focused on the corresponding subject (e.g., the image focused on the teddy bear or the image focused on the background) using the meta information of the original photo.

Another processor (not shown) can include one or more data processors, an image processor, or a CODEC. The data processors, the image processor, or the CODEC can be separately equipped or include a plurality of processors for different functions. The interface 801 interconnects the touch screen controller 865 and the extended memory 870 of the electronic device.

The sensor module 850 is coupled to the interface 801 to allow various functions. For example, a motion sensor and an optical sensor can be coupled to the interface 801 to detect a motion of the electronic device or to detect the light from the outside. Besides, other sensors such as position determining system, temperature sensor, or biometric sensor can be connected to the interface 801 to conduct relevant functions.

The camera 820 is coupled to the sensor module 850 through the interface 801 to perform the camera function such as photo and video clip recording.

The RF processor 840 performs a communication function. For example, under control of the communication processor 803, the RF processor 840 converts an RF signal to a baseband signal and provides the baseband signal to the communication processor 803, or converts a baseband signal output from the communication processor 803 to an RF signal and transmits the RF signal. Herein, the communication processor 803 processes the baseband signal according to various communication schemes. For example, the communication scheme can include, but not limited to, a Global System for Mobile communication (GSM) communication scheme, an Enhanced Data GSM Environment (EDGE) communication scheme, a Code Division Multiple Access (CDMA) communication scheme, a W-CDMA communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme, and/or a Bluetooth communication scheme.

The speaker/microphone 810 can input and output an audio signal for voice recognition, voice reproduction, digital recording, and telephone function. That is, the speaker/microphone 810 converts the voice signal to an electric signal or converts the electric signal to the voice signal. An attachable and detachable earphone, headphone, or headset (not shown) can be connected to the electronic device through an external port.

The touch screen controller 865 can be coupled to the touch screen 860. The touch screen 860 and the touch screen controller 865 can detect the touch and the motion or their abortion using, but not limited to, capacitive, resistive, infrared and surface sound wave techniques for determining one or more touch points with the touch screen 860 and a multitouch detection technique including various proximity sensor arrays or other elements.

The touch screen 860 provides an input/output interface between the electronic device and the user. That is, the touch screen 860 forwards a user's touch input to the electronic device. The touch screen 860 also presents the output of the electronic device to the user. That is, the touch screen 860 presents a visual output to the user. Herein, the visual output can be represented as text, graphic, video, and their combination.

The touch screen 860 can employ various displays, examples of which include, but are not limited to, Liquid Crystal Display (LCD), Light Emitting Diode (LED), Light emitting Polymer Display (LPD), Organic LED (OLED), Active Matrix OLED (AMOLED) or Flexible LED (FLED).

The GPS receiver 830 converts a signal received from an artificial satellite, to information such as location, speed, or time. For example, a distance between the satellite and the GPS receiver 830 can calculated by multiplying the speed of light by a signal arrival time, and measures the location of the electronic device using triangulation by obtaining accurate positions and distances of three satellites.

The extended memory 870 or the internal memory 804 can include fast random access memory such as one or more magnetic disc storage devices and/or non-volatile memory, one or more optical storage devices, and/or a flash memory (e.g., NAND and NOR).

The extended memory 870 or the internal memory 804 stores software. Software components include an operating system software module, a communication software module, a graphic software module, a user interface software module, an MPEG module, a camera software module, and one or more application software modules. Since the module being the software component can be a set of instructions, the module can be referred to as an instruction set. The module can be referred to as a program.

The operating system software includes various software components for controlling general system operations. The control of the general system operations includes, for example, memory management and control, storage hardware (device) control and management, and power control and management. The operating system software can process normal communication between various hardware devices and the software components (modules).

The communication software module allows communication with other electronic devices such as computer, server, and/or portable terminal, through the RF processor 840. The communication software module is configured in a protocol architecture of the corresponding communication scheme.

The graphic software module includes various software components for providing and displaying graphics on the touch screen 860. The term 'graphics' embraces text, webpage, icon, digital image, video, animation, and the like.

The user interface software module includes various software components relating to a user interface. The user interface software module is involved in the status change of the user interface and the condition of the user interface status change.

The camera software module includes camera related software components allowing camera related processes and functions. The application module includes a browser, an e-mail, an instant message, a word processing, keyboard emulation, an address book, a touch list, a widget, Digital Right Management (DRM), voice recognition, voice reproduction, a position determining function, a location based service, and the like. The memories 870 and 804 can include an additional module (instructions) in addition to the above-stated modules. Alternatively, if necessary, some of the modules (instructions) may not be used.

The application module includes instructions for shooting and storing the multi-focused image in the electronic device (see FIG. 6 and FIG. 7).

The instructions execute the photo preview function and set the multi-focus position. For example, a particular focus target is selected based on the user touch or the button input as shown in FIG. 1. In so doing, when the user selects the subjects of the interest regardless of their order in the photo preview mode using the touch and the button movement, the instruction stores the corresponding input order and the focus target positions in the electronic device. Alternatively, the multiple focus targets can be automatically selected. For example, the electronic device can detect the subjects in the captured image in the preview mode and store the position information of the corresponding focus target. Alternatively, the focus target can be input using the voice command instead of the user touch and the button manipulation. For example, when the "background" and the "person" are input, the image focused on the background and the image focused on the person can be created.

Further, the instruction determines the multi-focus information. That is, the instruction determines the camera lens position for each multi-focus target. In so doing, the order of the camera lens movement can be determined based on the order of the focus target input or to minimize the camera lens moving distance regardless of the focus target input order.

In other words, the instruction measures and arranges the distances of the input subject, determines the camera lens moving distance in order from the long distance to the short distance, from the short distance to the long distance, or at the current position, so as to minimize the moving distance, stores the camera lens moving information of the focus targets, and sets the shooting order in the image shooting. In FIG. 5, the lens is moved according to the method for moving the camera position from the short distance to the long distance of the camera lens distance movement optimization algorithm. The optimization can vary according to various embodiments of the present disclosure.

When the burst shot event occurs, the instruction shoots the focus targets by moving the camera lens in order based on the set focus information, that is, the camera lens position information of the focus targets (see FIG. 4 and FIG. 5). More specifically, the camera lens position is determined by the FV which is the value of the sharpness of the image in the selected focus region. The FV calculation method can adopt, but not limited to, Sobel, SML, FSWM filter, EOL, BE based on the DCT, and MF-DCT. The FV calculation method can adopt various algorithms.

The instruction inserts the exif information of the captured photo and the meta information indicating the multi-focused photo from the single angle, into the image file, and displays a particular one of the captured images according to the multi-focus information. The particular image is captured by focusing on a particular subject.

When displaying the particular photo including the multi-focus photo information and detecting the touch or the key input to the subject of the corresponding image, the instruction displays the photo captured from the same angle with the focus on the corresponding touched subject. By contrast, when no photo focuses on the corresponding subject, the instruction displays the current photo or the photo focused on the closest region of the subject according to the user's setup.

The instruction composes the subjects of the optimized focus information. For example, the instruction composes the image focused on the teddy bear of FIG. 2 and the image focused on the background of FIG. 3. That is, the new image is created by composing the focused teddy bear and the focused background.

The instruction inserts the meta information including the original image information to the composite image file and displays the composite photo. For example, the meta information about the image focused on the teddy bear and the image focused on the background is inserted to the image file generated by composing the focused teddy bear and the focused background.

When the event displays the original photo from the composite photo, for example, when the event displays the original photo of the image focused on the teddy bear or the image focused on the background in the composite image of the focused teddy bear and the focused background, the instruction displays the original photo focused on the corresponding subject (e.g., the image focused on the teddy bear or the image focused on the background) using the meta information of the original photo.

The various functions of the electronic device as mentioned above and to be explained, can be executed by hardware and/or software and/or their combination including one or more signal processing and/or Application Specific Integrated Circuits (ASICs).

While the portable terminal includes the embedded digital camera by way of example, the present disclosure is applicable to a digital camera supporting the auto focus function.

As set forth above, since the multiple focuses are set through the manual touch or automatically and then the plurality of the images is obtained through the burst shots, the user does not have to move the focus several times from the fixed angle.

The electronic device can store the image having the multi-focus information through the single angle setting, and generate the optimal image by composing the subjects of the shot focus information as demanded by the user.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method in an electronic device, comprising:
   display a plurality of objects in an image in a preview mode;
   receiving a user input to select a plurality of focus targets among the plurality of objects in the preview mode;
   calculating respective camera lens moving distances to focus each of the plurality of focus targets based on a current position of the camera lens;
   detemining an order of the focus targets to be focused in order to minimize a sum of the respective camera lens moving distances; and
   shooting an image of each focus target from a single fixed angle based on the determined order by reference to the camera lens moving distances of the focus targets.

2. The method of claim 1, wherein the selecting of the plurality of focus targets in the preview mode comprises at least one of:
   detecting a multi-touch input of a user and automatically detecting the plurality of focus target.

3. The method of claim 1, further comprising:
   adding information indicating the multi-focused image to meta infoiination of the image of each focus target.

4. The method of claim 1, further comprising:
   displaying an image focused on a particular focus target.

5. The method of claim 4, further comprising:
    detecting a touch input on a particular subject in the image focused on the particular focus target;
    searching for an image focused on the touched subject; and
    displaying the image focused on the touched subject.

6. The method of claim 5, further comprising:
    when finding no image focused on the touched subject, performing at least one of maintaining a current image and displaying an image focused on a portion closest to the touched subject.

7. The method of claim 1, further comprising:
    selecting at least two images of the plurality of focus targets captured from the fixed single angle;
    combining the selected at least two images into an image; and
    displaying an image of the combined image.

8. The method of claim 7, further comprising:
    adding information of the selected at least two images into meta information of the combined image.

9. An electronic device comprising:
    a camera;
    at least one processor;
    a memory; and
    one or more programs stored in the memory and configured for execution by the at least one processor,
    wherein the program comprises instructions for:
        displaying a plurality of objects in an image in a preview mode;
        receiving a user input to select a plurality of focus targets among the plurality of objects in the preview mode,
        calculating respective camera lens moving distances to focus each of the plurality of focus targets based on a current position of the camera lens;
        determining an order of the focus targets to be focused in order to minimize a sum of the respective camera lens moving distances; and
        shooting an image of each focus target with a single fixed angle based on the determined order by reference to the camera lens moving distances of the focus targets.

10. The electronic device of claim 9, wherein the instruction for selecting the plurality of focus targets in the preview mode comprises an instruction for at least one of detecting a multi-touch input of a user and automatically detecting the plurality of focus target.

11. The electronic device of claim 9, wherein the program further comprises an instruction for adding information indicating the multi-focused image to meta information of the image.

12. The electronic device of claim 9, wherein the program further comprises an instruction for displaying an image focused on a particular focus target.

13. The electronic device of claim 12, wherein the program further comprises instructions for detecting a touch input on a particular subject in the image focused on the particular focus target, searching for an image focused on the touched subject, and displaying the image focused on the touched subject.

14. The electronic device of claim 13, wherein the program further comprises an instruction for, when finding no image focused on the touched subject, at least one of maintaining a current image and displaying an image focused on a portion closest to the touched subject.

15. The electronic device of claim 9, wherein the program further comprises instructions for selecting at least two images of the plurality of focus targets captured from the single fixed angle, combining the selected at least two images into an image, and displaying an image of the combined image.

16. The electronic device of claim 15, wherein the program further comprises an instruction for adding information of the selected at least two images to meta information of the combined image.

17. An apparatus of a camera for shooting a multi-focused image, comprising:
    a camera lens; and
    a processor configured to:
        display a plurality of objects in an image in a preview mode;
        receive a user input to select a plurality of focus targets among the plurality of objects in the preview mode;
        calculate respective camera lens moving distances to focus each of the plurality of focus targets based on a current position of the camera lens;
        determine an order of the focus targets to be focused in order to minimize a sum of the respective camera lens moving distances; and
        shoot an image of each focus target with a single fixed angle based on the determined order by reference to the camera lens moving distances of the focus targets.

18. The apparatus of claim 17, wherein the processor is further configured to determine a shooting order of the focus targets to minimize the camera lens moving distances of the plurality of focus targets.

19. The apparatus of claim 17, wherein, to select the focus targets in the preview mode, the processor is further configured to detect at least one of a multi-touch input of a user and automatically detects the plurality of focus target.

20. The method of claim 17, wherein the processor is further configured to add information indicating the multi-focused image to meta information of the image.

21. The apparatus of claim 17, wherein the processor is further configured to display an image focused on a particular focus target.

22. The apparatus of claim 21, wherein the processor is further configured to detect a touch input on a particular subject in the image focused on the particular focus target, search for an image focused on the touched subject, and display the image focused on the touched subject.

23. The apparatus of claim 22, wherein the processor is further configured to, when finding no image focused on the touched subject, either maintain a current image or display an image focused on a portion closest to the touched subject.

24. The apparatus of claim 17, wherein the processor is further configured to select at least two images of the plurality of focus targets captured from the single fixed angle, combine the at least two selected images into an image, and displays an image of the combined image.

25. The apparatus of claim 24, wherein the processor is further configured to add information of the selected at least two images to meta information of the combined image.

\* \* \* \* \*